United States Patent
Kaminski et al.

(10) Patent No.: US 7,276,197 B2
(45) Date of Patent: Oct. 2, 2007

(54) METHOD FOR IN-MOLD LAMINATION OF FOILS

(75) Inventors: Axel Kaminski, Wermelskirchen (DE); Roland Künzel, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 41 days.

(21) Appl. No.: 10/484,289

(22) PCT Filed: Jul. 10, 2002

(86) PCT No.: PCT/EP02/07666
§ 371 (c)(1),
(2), (4) Date: Jan. 20, 2004

(87) PCT Pub. No.: WO03/011555
PCT Pub. Date: Feb. 13, 2003

(65) Prior Publication Data
US 2004/0169315 A1 Sep. 2, 2004

(30) Foreign Application Priority Data
Jul. 23, 2001 (DE) .................................. 101 35 816

(51) Int. Cl.
*B29C 45/14* (2006.01)

(52) U.S. Cl. ........................................ 264/278; 264/247
(58) Field of Classification Search ............... 264/247, 264/275, 278, 271.1
See application file for complete search history.

(56) References Cited

U.S. PATENT DOCUMENTS 4,427,615 A * 1/1984 Eskesen ...................... 264/261
5,053,179 A * 10/1991 Masui et al. ................. 264/257

FOREIGN PATENT DOCUMENTS

| DE | 100 36 982 | 2/2001 |
| EP | 0 546 234 | 6/1993 |
| EP | 1 008 527 | 6/2000 |
| WO | 92/16349 | 10/1992 |

OTHER PUBLICATIONS

Patent Abstracts of Japan vol. 16, No. 34 (M-1204), Jan. 28, 1992 & JP 03 243312 A (Mitsubishi Plastics Ind Ltd), Oct. 30, 1991.

* cited by examiner

*Primary Examiner*—Edmund H. Lee
(74) *Attorney, Agent, or Firm*—Aron Preis

(57) ABSTRACT

A method is described for the back-moulding of sheets (7) with thermoplastics, in particular of printed sheets to protect the decorated surface against scratching or detachment, in which a sheet (7) that is initially separated from the moulded-article wall is pressed against the moulded-article wall by the melt front (3).

9 Claims, 1 Drawing Sheet

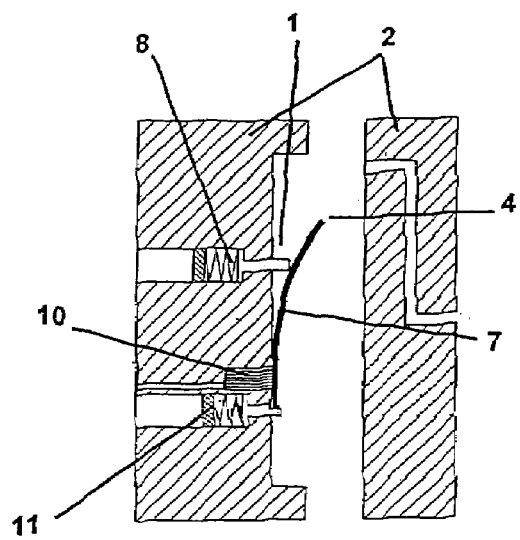
Fig. 1
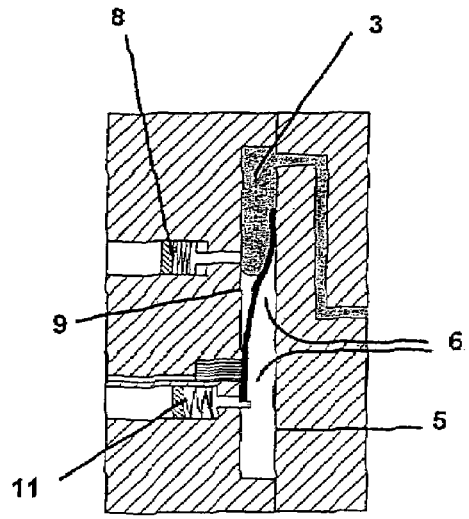
Fig. 2
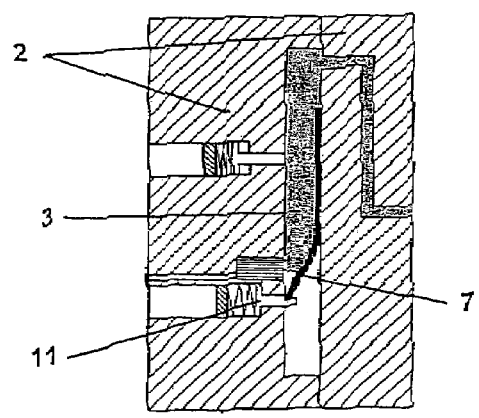
Fig. 3
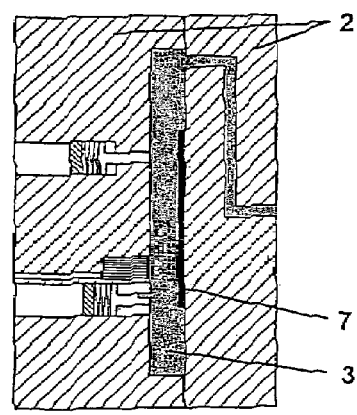
Fig. 4
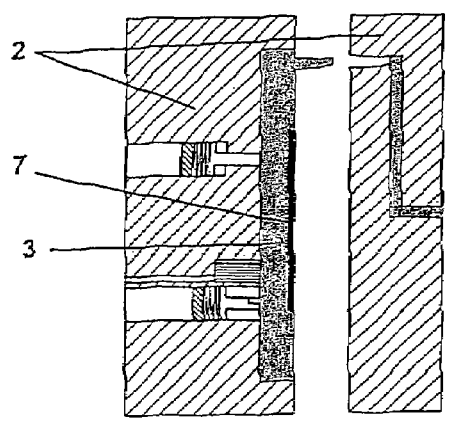
Fig. 5
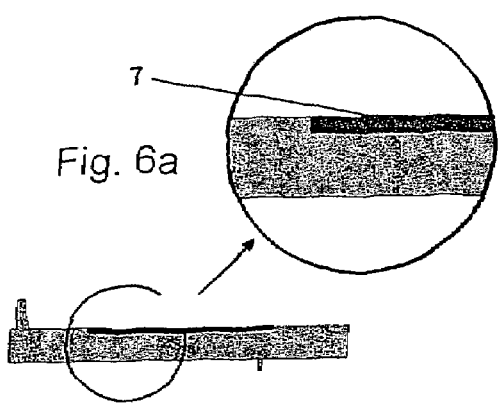
Fig. 6
Fig. 6a

METHOD FOR IN-MOLD LAMINATION OF FOILS

The invention relates to a method for the back-moulding of sheets, in particular of printed sheets to protect the decorated surface against scratching or detachment.

In the context of fitting e.g. rating plates on the surface of moulded thermoplastic articles, e.g. for hand-held electrical appliances, it is known to present sheets in the mould tool of an injection-moulding tool inside a fixing frame, and to join them to the moulded article by injecting thermoplastic over them. The two known methods, i.e. placing a sheet in an indentation in the wall of the mould cavity or placing the sheet in the mould frame which surrounds the sheet in the mould cavity, lead to moulded articles in which the edge of the sheet is not surrounded by thermoplastic. It is an object of the invention to develop an injection-moulding method which permits edge protection of the sheet placed in the mould cavity and hence prevents possible attack surfaces for mechanical action, in particular on the edges of the sheet.

The object is achieved according to the invention by the fact that, with the aid of a modified injection-moulding tool design, the sheets are partially fixed in a tool half constituting the non-visible moulded-article surface, and are gradually transferred onto the opposite tool side during the moulding process by the advancing front of the thermoplastic, the bounding edges in the sheet being enclosed by plastic.

The invention relates to a method for the back-moulding of, in particular, sheets printed on their rear side with thermoplastic, in an injection-moulding device, characterised in that the sheet in the mould cavity of the injection-moulding tool is initially applied with its edge that meets the front of the melt against the wall of the mould cavity, whereas the rest of the sheet is kept separated from the wall, and in that the part of the sheet that is separated from the wall is pressed against the wall by the incoming melt front advancing in the mould cavity, the support of the sheet being released the same time, so that the rest of the sheet is also applied against the wall of the mould cavity.

A method in which, before the melt enters the mould cavity, the sheet is applied against the wall of the mould cavity with the aid of a depressor, and the depressor is retracted when the melt enters, is preferred.

A plastic selected from the list: polycarbonate, polyurethane, polyester, polyvinyl chloride is preferably used as the sheet material.

In a particularly preferred method, polycarbonate is used as the sheet material.

The thermoplastic is preferably selected from the list: polyamide, polyester, polyurethane, styrene copolymer, polyphenylene oxide, polycarbonate, polyethylene sulfide, polyvinyl chloride, polyurethane or possible mixtures of the said polymers.

Polyamide or polycarbonate is particularly preferably used as the thermoplastic.

In another preferred embodiment of the invention, before the melt enters, the sheet is held at its lower part, which faces away from the melt front, against the wall of the mould cavity opposite the wall, in particular using a sintered block under reduced pressure, and is released as the melt front advances in the mould cavity.

A method in which, before the melt enters, the sheet is positioned at its lower end, which faces away from the melt front, with the aid of at least one stop that can be withdrawn from the mould cavity, particularly preferably using at least two lower stops and one lateral stop, is also particularly preferred.

With the aid of the method according to the invention, it is possible for e.g. rating plates and decorated sheets to be moulded onto moulded articles during the injection-moulding process, and a subsequent adhesive-bonding process can be avoided. This obviates the need for an extra working step. When using sheets printed on their rear side, in particular transparent sheets, the edge encapsulation makes it possible to protect the decoration against abrasion and mechanical detachment.

The invention will be explained in more detail below with reference to the figures, in which:

FIG. 1 shows the opened mould tool with the mould cavity when the sheet is put in.

FIG. 2 shows a cross section through the mould cavity when the thermoplastic enters.

FIG. 3 shows a further stage in which the end of the sheet is lifted off from the retaining pin.

FIG. 4 shows a cross section during the withdrawal of a second gripper pin from the mould cavity, and FIG. 5 shows the opening of the mould cavity to remove the moulded article.

FIG. 6 shows a cross section through the moulded article.

FIG. 6a shows an enlarged detail from FIG. 6.

EXAMPLE

FIG. 1 shows a cross section through the opened mould cavity 1 of an injection-moulding tool 2, in which the sheet 7 (an EPC sheet which is printed on its rear side) is held at its edge, namely the bottom edge in FIG. 1, by a spring-loaded ejector 11 on one wall 9 of the injection-moulding tool, whereas the other end of the sheet 7, whose edge is directed towards the inlet channel for the thermoplastic 3, is lifted by another spring-loaded ejector 8 and, when the mould cavity 1 is closed, it is applied against the opposite wall 5 of the mould cavity, on which the sheet 7 is intended to have its final position.

FIG. 2 shows that, after the thermoplastic 3 enters, it applies the sheet 7 by the advancing front of the thermoplastic 3 against the wall 5 of the mould cavity 1. Meanwhile, the spring-loaded ejector 8 is withdrawn from the mould cavity 1 and the melt front 3 of the thermoplastic (polyamide 6) then advances further in the mould cavity 1 and applies the sheet 7 smoothly against the mould-cavity wall 5.

In FIG. 3, it can be seen that the lower end of the sheet 7 is lifted off from the retaining pin 11. The mould cavity 1 is then completely filled with thermoplastic 3, the edges of the sheet 7 being encapsulated by thermoplastic 3. The production cycle is completed by opening the mould cavity 1 according to FIG. 5 and ejecting the finished moulded article.

FIGS. 6 and 6a show how the edge encapsulation of the sheet 7 appears schematically in cross section. The sheet plate is completely enclosed by thermoplastic 3 at the edges, and does not offer any possibility of attack for mechanical removal of the plate (sheet 7) or lateral extraction of the rear-side printing of the sheet 7.

The invention claimed is:

1. Method for the back-moulding of sheets printed on their rear side with thermoplastic, in an injection-moulding device having mould cavity (1) with a wall (9) and an opposite wall (5), characterised in that the sheet (7) is place in the mould cavity (1) of the injection-moulding tool (2) in such a way that it is initially applied, before the molten plastic enters, with its edge (4) that meets the front of the melt (3) against the opposite wall (5) of the mould cavity (1), whereas the rest of the sheet is kept separated from the wall (9), and in that the part (6) of the sheet (7) that is separated from the wall (9) is pressed against the opposite wall (5) by the incoming melt front advancing in the mould cavity (1), the support of the sheet (7) being released the same time, so that the rest of the sheet (7) is also applied against the opposite wall (5) of the mould cavity (1).

2. Method according to claim 1, characterised in that, before the melt (3) enters the mould cavity (1), the sheet is applied against the wall (5) of the mould cavity (1) with the aid of a depressor (8), and in that the depressor (8) is retracted when the melt enters.

3. Method according to claim 1, characterised in that the sheet material is a plastic selected from the list: polycarbonate, polyurethane, polyester, polyvinyl chloride.

4. Method according to claim 1, characterised in that the thermoplastic is selected from the list: polyamide, polyester, polyurethane, styrene copolymer, polyphenylene oxide, polycarbonate, polyethylene sulfide, polyvinyl chloride, polyurethane or possible mixtures of the said polymers.

5. Method according to claim 3, characterised in that polycarbonate is used as the sheet material.

6. Method according to claim 4, characterised in that polyamide or polycarbonate is used as the thermoplastic.

7. Method according to claim 1, characterised in that that, before the melt (3) enters, the sheet is held at its lower part (6), which faces away from the melt front (3), against the wall (9) of the mould cavity (1) opposite the wall (5), and is released as the melt front (3) advances in the mould cavity (1).

8. Method according to claim 1, characterised in that, before the melt enters, the sheet is positioned at its lower end, which faces away from the melt front, with the aid of at least one stop (11) that can be withdrawn from the mould cavity (1).

9. The method according to claim 7, characterised in that that the sheet is held at its lower part using a sintered block (10) under reduced pressure.

* * * * *